United States Patent
Connor

(10) Patent No.: US 7,061,866 B2
(45) Date of Patent: Jun. 13, 2006

(54) METERED PACKET FLOW FOR PACKET SWITCHED NETWORKS

(75) Inventor: Patrick L. Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 806 days.

(21) Appl. No.: 10/044,748

(22) Filed: Jan. 10, 2002

(65) Prior Publication Data

US 2003/0128664 A1 Jul. 10, 2003

(51) Int. Cl.
*H04J 1/16* (2006.01)
(52) U.S. Cl. ........................... 370/235; 370/229
(58) Field of Classification Search ............ 370/229, 370/232, 235, 236, 412–418, 428, 429, 253, 370/252, 378, 381, 384, 386, 389, 426; 709/235, 709/233, 232
See application file for complete search history.

(56) References Cited

U.S. PATENT DOCUMENTS 6,031,821 A * 2/2000 Kalkunte et al. ............ 370/235
6,456,590 B1 * 9/2002 Ren et al. .................... 370/229

OTHER PUBLICATIONS

U.S. Patent Application for *Method and Apparatus for Transmitting Packets onto a Network* by Patrick J. Luhmann, et al., filed Dec. 15, 2000, 17-pgs.
U.S. Patent Application for *Apparatus and Method for Packet Ingress Interrupt Moderation* by Patrick L. Connor, filed Sep. 27, 2001, 28-pgs.

* cited by examiner

*Primary Examiner*—Brenda Pham
(74) *Attorney, Agent, or Firm*—Pillsbury Winthrop Shaw Pittman LLP

(57) ABSTRACT

A method of reducing a transmission rate includes determining whether a pause has been received. Whether a maximum of an inter-frame spacing (IFS) has been reached is determined if the pause has been received. The inter-frame spacing is increased by a value if the maximum of the inter-frame spacing has not been reached.

20 Claims, 3 Drawing Sheets

METERED PACKET FLOW FOR PACKET SWITCHED NETWORKS

BACKGROUND OF THE INVENTION

1. Field of the Invention

The present invention generally relates to a packet switched network. More particularly, the present invention relates to a method of dynamically metering packet flow in a packet switched network to reduce or avoid packet loss.

2. Discussion of the Related Art

Ethernet local area networks (LANs) offer a hardware driven method of flow control based on a receive first-in-first-out (FIFO) "fullness" threshold. This Ethernet flow control standard is covered in the Institute of Electrical and Electronics Engineers (IEEE) 802.3x Standard specification. The Ethernet flow control standard is intended to reduce FIFO overruns, which result in packet loss. Packet loss reduces the network reliability and reduces available bandwidth.

In Ethernet flow, a media access control (MAC) device/receiver (e.g., any network device, endpoint, or infrastructure, such as a server, client, switch, router, bridge, etc.) receives packets, the packets are placed into a FIFO buffer. The packets are processed, and the FIFO space that they once occupied is then made available for subsequent packets. Processing a packet generally includes direct memory access (DMA) transfer of the packet to system memory, or forwarding it onto another MAC device to be transmitted, such as another port or switch. Packet processing may additionally include tasks such as checksum verification or decryption operations. If the rate of incoming packets exceeds the rate at which the MAC device can process them, the MAC device's receiver FIFO begins to fill. When a fullness threshold is exceeded, the MAC device sends a pause packet to its link-partner. A pause packet or frame causes the link-partner to momentarily stop transmitting to the receiver. This pause allows the receiver time to process the already received packets in the FIFO and prevents the receiver's FIFO from overflowing with subsequent packets.

The IEEE 802.3x Standard flow control does not completely prevent packet loss. Even in a back-to-back two system network, packet loss is not completely prevented. First, the controllers only transmit a pause frame after a fullness threshold in the receive FIFO has been reached. However, the pause frame cannot be always sent immediately after the threshold has been reached. To avoid other protocol violations, the pause frame can be only sent after the controller completes transmitting the current frame, if any, already being sent. The pause frame then propagates across the media. Once the sending station receives the pause frame, it processes the frame before it can respond. If the sending station is in the middle of sending a packet, this packet transmission must be completed before the pause request is honored. All of these delays may result in several kilobytes of data arriving after the threshold value is crossed. This occurrence can result in overrun and packet loss.

Additionally, even if the sending station heeds the pause request promptly and ceases sending packets before an overrun occurs, the pause is only momentary. There is no guarantee that the receiver will be able to free up FIFO space and make room for subsequent packets during this momentary pause. For example, the receiver may be waiting for access to a shared bus, such as a peripheral component interconnect (PCI) bus, to transfer packets to the system memory. If the bus is heavily loaded, the controller may not be granted access before the pause time expires. In this case, the receiver's FIFO would not drain to host memory to make room for subsequent packets while the sender was pausing. After the pause, the sender may continue sending packets that overrun the receiver's buffering capabilities.

The above-mentioned conditions may occur even in a simple back-to-back connected network, or with two personal computers (PCs). If one or more switches and several clients are in the network, then the intrastate devices may drop packets as well. Pause frames do not propagate, and so a switch may be forced into a situation where it is receiving packets destined for an end station to which it is not allowed to forward packets, due to receiving a pause frame from that station. This error will quickly consume the switch's buffering capabilities.

Accordingly, there is a need for a flexible method of monitoring packet flow to prevent and reduce packet loss while utilizing existing protocols.

DETAILED DESCRIPTION

Although pause frames ma y not completely prevent packet loss, they are a good indication that the receive station's rate of packet processing is not equal to the rate at which the link-partner is sending frames. The pause frame is an indication that the transmitter should slow down the data rate to better match the receiver's packet processing capabilities. The present invention utilizes the reception of pause frames to adjust the egress data rate to better match the link-partner's ingress data processing rate.

Figure 1:
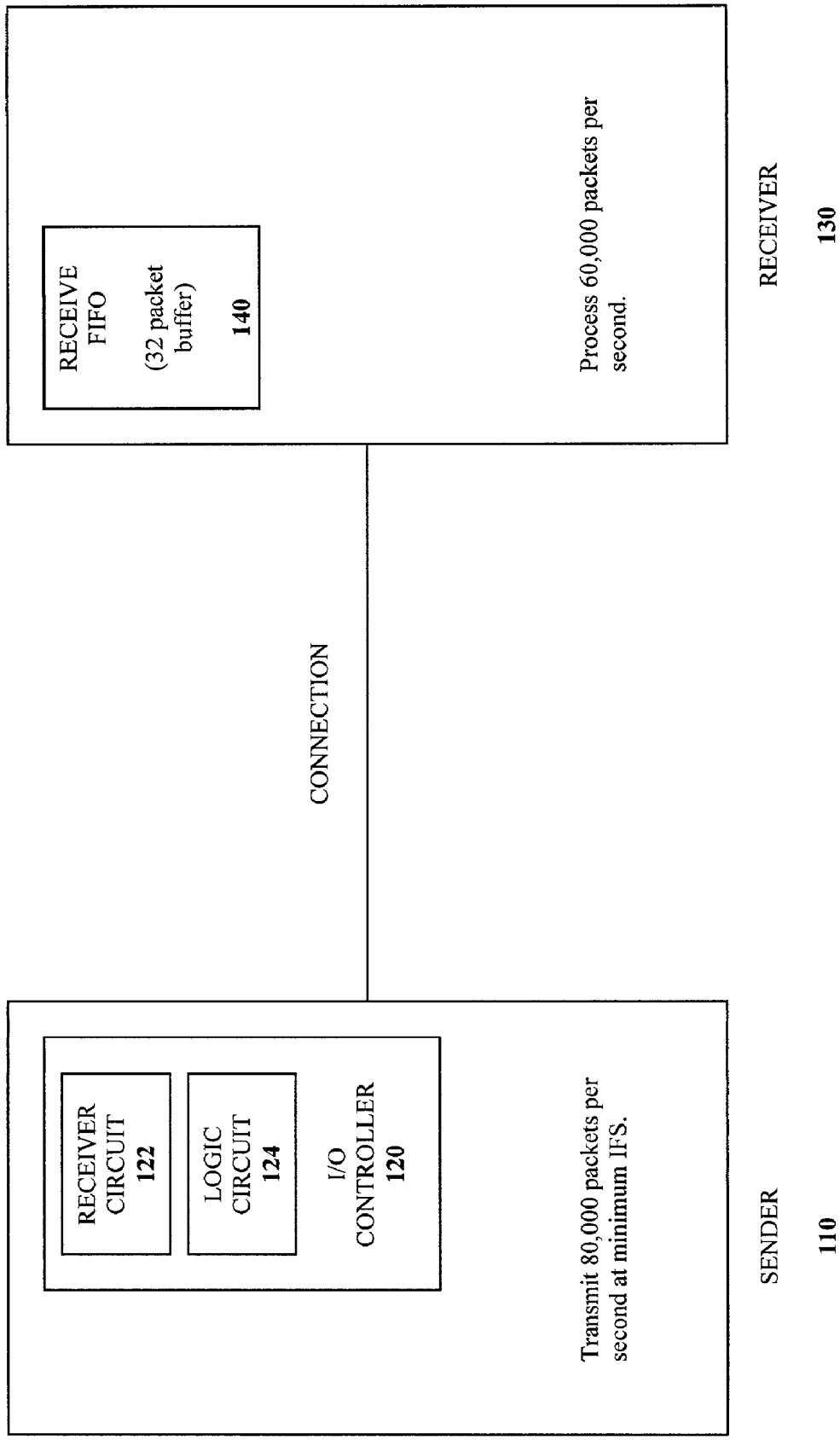
FIG. 1 illustrates a packet switched network having a sender and a receiver according to an embodiment of the present invention.

FIG. 1 illustrates a packet switched network having a sender and a receiver according to an embodiment of the present invention. A sender 110 transmits data packets to a receiver 130 over a connection. The sender 110 includes an input/output controller 120 having a receiver circuit 122 and a logic circuit 124 (to be explained further below). The receiver 130 includes a receive first-in-first-out (FIFO) buffer 140 that buffers the incoming data packets transmitted from the sender 110. In the prior art systems, pause frames may add delay to the entire system, and may still result in overrun and packet loss within the system.

Figure 2:
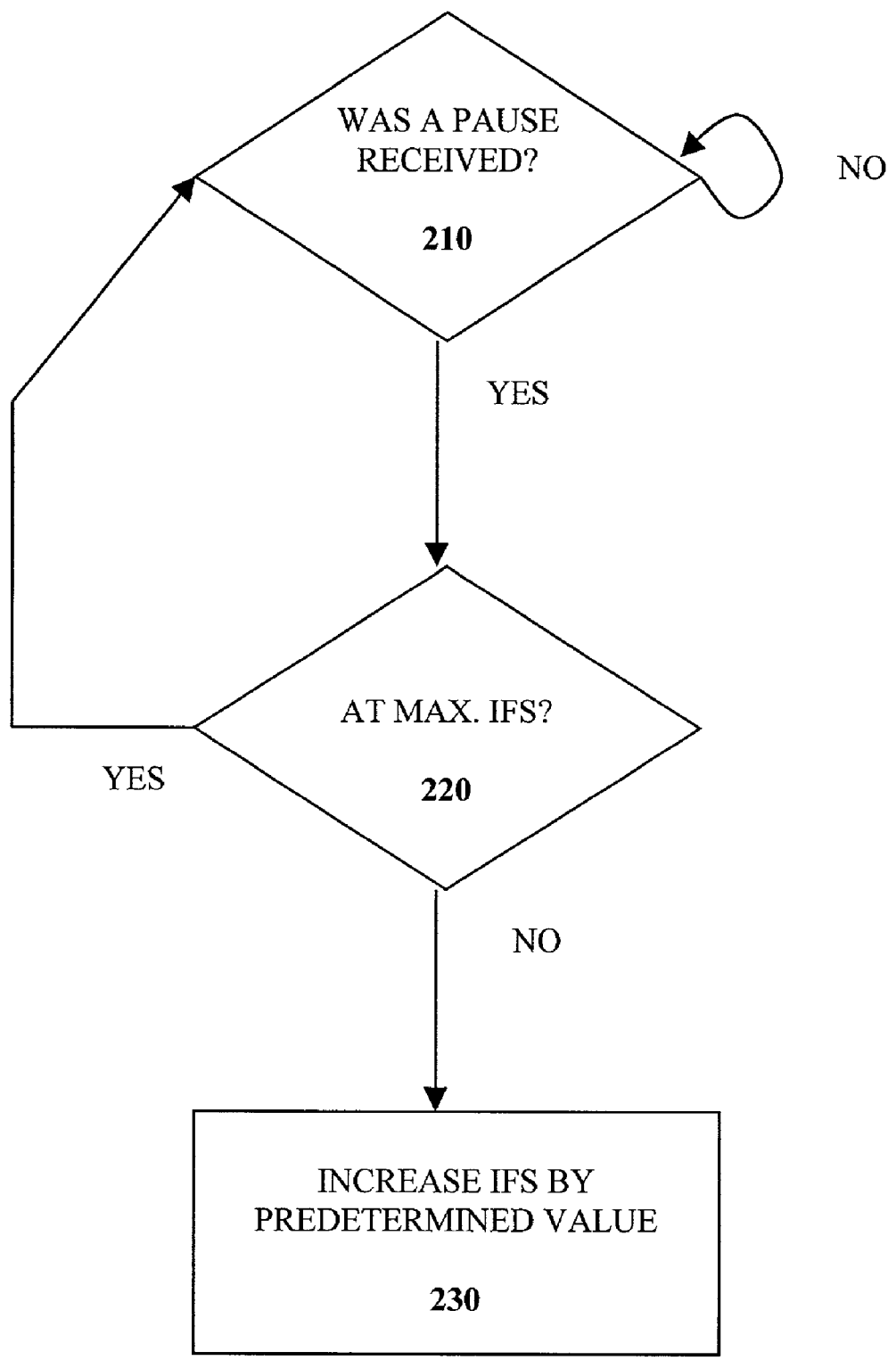
FIG. 2 illustrates a flow chart diagram of reducing a transmission rate according to an embodiment of the present invention.

FIG. 2 illustrates a flow chart diagram of reducing a transmission rate according to an embodiment of the present invention. The pause frame indication is utilized to reduce the transmit rate after the momentary pause. The transmit rate may be decreased by increasing the Inter-Frame Spacing (IFS). The IFS is also referred to as the Inter-Packet Gap (IPG). The IFS or IPG is a period of time that the transmitter waits in order to allow the signal to propagate through the receiver electronics at the destination. In a Gigabyte Ethernet implementation, the minimum IFS value is 12 byte times. A byte time is the time it takes to send a byte of data onto the network media. Because networks can operate at various speeds, the byte time measurement is often used because it scales with the speed of a particular network implementation. There are also other considerations, such as encoding, that affect the speed. A byte is typically eight bits of data, but, depending on the physical media, the byte may be encoded as ten-bits on the media.

First, an input/output controller of a MAC device sender 110, for example, determines whether a pause frame has been received 210 from the receiver 130. If a pause frame has not been received by the data packet sender 110, then the algorithm loops back to step 210. If a pause frame has been received, then it is determined whether the maximum IFS has been reached 220. If the maximum IFS has not been reached, then the IFS is increased by a value 230, e.g., 80 byte times, in order to decrease the transmit rate. If the maximum IFS has been reached, then the algorithm loops back to step 210 (as the IFS cannot be increased any further). This algorithm may be executed each time a pause frame is received. The transmit rate ultimately will be lowered to a point at which no pause frames are being transmitted by the receiver 130, and the egress data rate is therefore adjusted to match the link-partner's ingress data processing rate.

Figure 3:
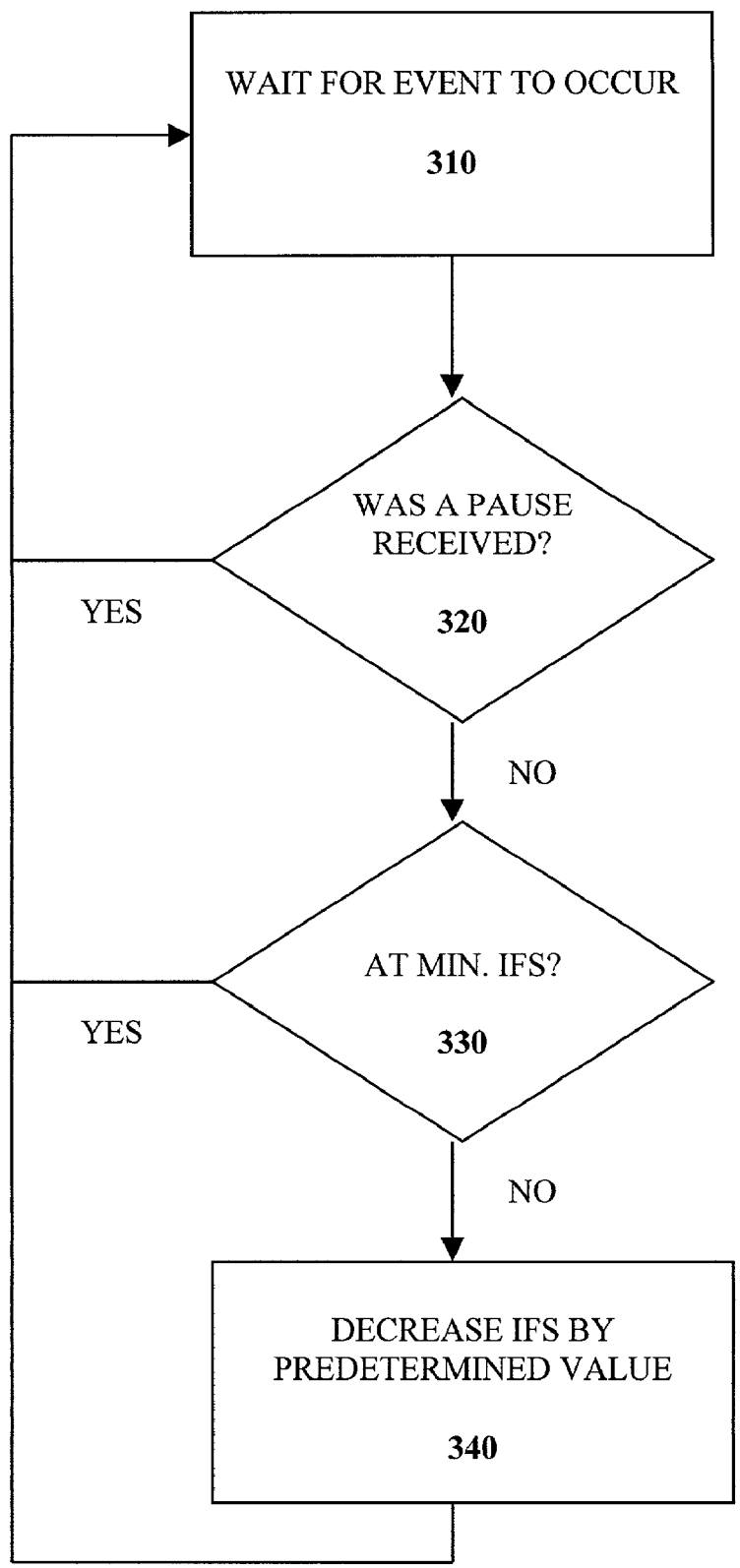
FIG. 3 illustrates a flow chart diagram of retraining a transmission rate according to an embodiment of the present invention.

FIG. 3 illustrates a flow chart diagram of retraining a transmission rate according to an embodiment of the present invention. As the system and network environments change over time, a gradual retraining of the transmission rate that returns the transmission rate towards the minimum IFS value (i.e., increasing the transmission rate) may be implemented if no additional pause frames are received by the data packet sender 110.

First, an input/output controller of a MAC device sender 110, for example, determines whether a triggering event has occurred 310 to begin retraining of the transmission rate. The event may be a poll-time (which is not really an "event" at all), i.e., after waiting a specified period of time (e.g., one to two seconds), and if nothing occurred, the retrain algorithm is executed. The event may also be packet-count driven, e.g., the retrain algorithm is initiated when a specific packet count value is reached. If a triggering event has occurred 310, then it is determined whether a pause frame has been received 320 by the data packet sender 110. If a pause frame has been received by the data packet sender 110 from the receiver 130, then the algorithm loops back to step 310 (meaning that the transmit rate is still too high for the receiver 130, hence the continued reception of pause frames). If a pause frame has not been received by the data packet sender 110, then it is determined whether the minimum IFS has been reached 330. If the minimum IFS has been reached, then the algorithm loops back to step 310 (as the IFS cannot be decreased any further). If the minimum IFS has not been reached, then the IFS is decreased by a value 340, e.g., 16 byte times, in order to gradually increase the transmit rate. This algorithm may be utilized so that the transmission rate gradually returns toward the minimum IFS value (and the transmission rate is increased) over time if no additional pause frames are received.

The algorithms of FIGS. 2 and 3 are further explained with the following example with reference to FIG. 1. Consider a medium (sender) 110 that at minimum IFS with full-length packets can transfer 80,000 packets per second, and a receiver 130 that can process 60,000 packets per second and can buffer 32 packets in its receive FIFO buffer 140. A pause frame is sent by the receiver 130 to the data packet sender 110 when the 25th full-length packet is buffered in the FIFO 140 (i.e., the fullness threshold is set at the 25th packet). For present purposes, it is assumed that the pause time is 10 full-length packet times at wire speed. These sample values are roughly equivalent to an Intel 82542 Gigabit Ethernet network controller. However, any other senders/transmitters with different transmit, processing, and FIFO buffering characteristics may be utilized.

Therefore, the sending station is capable of sending at wire speed 80,000 packets per second. Without implementing the algorithm of FIG. 2, for example, the receiving station will send many pause frames. At these rates, the 25th packet is buffered after 1.25 milliseconds. The pause frame is sent, and one to three frames are sent before the sender heeds the pause request. Then, the sender pauses for 10 packet times. This example allows the receiver to process 7.5 packets, which leaves about 18.5 packets in the FIFO when the sender resumes transmitting. The receiver's threshold is again reached in approximately 325 microseconds. The system enters a steady state of pause frames at this rate, resulting in approximately 3,000 pause frames being sent per second. Each of these 3,000 events has the potential to result in packet loss.

However, if the algorithm of FIG. 2 is implemented, the sender 110 meters the packet rate to match that of the receiver 130 processing rate, and pause frames become more infrequent. The algorithm of FIG. 2 may be configured so that each time the sender 110 receives a pause request, it reduces the transmit rate by, for example, 5%. Furthermore, the algorithm of FIG. 3 may be configured so that the retrain poll interval is once per second, and increases the transmit rate by, for example, 1%, when no pause requests are detected for a given period of time.

Assuming that the sender 110 starts at minimum IFS (i.e., full speed), the initial pause frame is sent at the same time as in the example above without any metering. However, the sender 110 reduces the send rate to 76,000 packets per second (i.e., a 5% reduction of 80,000) before continuing to transmit. This adjustment results in the next pause frame to occur 400 microseconds later. This subsequent pause frame again reduces the transmit rate. This cycle continues with pause events occurring further and further apart until the transmit rate is less than or equal to the receiver's 130 processing rate. In this example, the transmit rate decreases by the following intervals: 80,000; 76,000; 72,200; 68,590; 65,160; 61,902; and 58,807 (each rate reflecting a 5% reduction from the previous rate).

At this point, the receiver 130 is able to process packets slightly faster than they are being sent (the sample receiver 130 being capable of processing 60,000 packets per second). Therefore, no pause frames are being sent and the retrain algorithm of FIG. 3 may be implemented. The retrain algorithm of FIG. 3 slowly increases the transmit rate if no pause requests are detected. In the example, where the increase rate is set at 1% from the previous rate, the transmit rate increases by the following intervals: 58,807; 59,395; 59,989; to 60,589. Only after three poll times did the transmit rate exceed the receiver's 130 packet processing capabilities. In the example, a poll time is one second long. Therefore, this example went from 3,000 possibilities of dropping packets per second (without any metering) to one chance in every three seconds, which is an obvious improvement over the situation of not utilizing the algorithms of FIGS. 2 and 3. In one embodiment, the sender 110 includes an input/output controller 120 having a receiver circuit 122 to detect and/or receive the pause requests, and a logic circuit 124 to implement the algorithms to reduce the transmit rate and/or to retrain the transmit rate.

Despite the fact that these algorithms result in the system running at less than the receiver's 130 maximum rate, this implementation is still likely to result in overall better throughput due to the long delays required by protocols, such as Transmission Control Protocol (TCP), to detect lost packets, and due to the bandwidth lost to retransmissions.

In general, assuming that excess rates may be detected within one poll time, the transmit rate may fluctuate from a low rate of "Receiver Rate−X" (where X is the value used to increase the IFS, e.g., 80 byte times in the sample above) to a high of "Receiver Rate+Y" (where Y is the value used to decrease the IFS, e.g., 16 byte times in the sample above). Therefore, selection of the values X and Y may be used to tune the tolerance to packet loss, and the values selected for X and Y may vary from one system to the next. Additionally, the values selected to increase the inter-frame spacing may also be based upon a pause time in a pause frame, a frequency of pause frames, and a proximity of a current inter-frame spacing to the maximum or the minimum of the inter-frame spacing.

The present invention is applicable to any high speed input/output scenario and is not limited to the specific hardware specifications, the transmit and processing rates, and the values as set forth above. The algorithms of FIGS. 2 and 3 are particularly useful in 10 Gigabit Ethernet Wide Area Network (WAN) implementations where part of the network is likely to be a 9.294196 Gigabit-per-Second Synchronous Optical Network (SONET) connection. (See IEEE Draft P802.3ae/D4.0 and Draft Supplement to IEEE Standard 802.3, Dec. 6, 2001, Clause 50.1 and 50.1.2 of the 802.3ae Draft (4.0) Specification.) End stations, such as client and server PCs, are one application for the present invention. In particular, end stations can queue egress traffic in the abundant host memory. This feature allows metered egress without overrun.

Accordingly, preventing packet loss by implementing the present invention improves network reliability and overall system throughput. The reception of pause frames to adjust the egress data rate is better in matching the link-partner's data processing rate. Although an Ethernet application is described herein as one example, the present invention may be utilized on any media layer protocol that supports an explicit pause indication.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of controlling a transmission rate, comprising:
   determining whether a pause frame has been received after a packet count value is reached;
   determining, after waiting a pause time specified by the pause frame, whether a maximum of an inter-frame spacing (IFS) has been reached if the pause frame has been received; and
   increasing the inter-frame spacing by a value if the maximum of the inter-frame spacing has not been reached to reduce the transmission rate.

2. The method according to claim 1, wherein the value is based on a selection from the group consisting of, a frequency of pause frames and a proximity of a current inter-frame spacing to the maximum or a minimum of the inter-frame spacing.

3. The method according to claim 1, wherein the value is in byte time units, a byte time unit being the time it takes to send a byte of data onto a network media.

4. A method of increasing a transmission rate, comprising:
   determining whether a pause frame has been received after waiting the poll time;
   determining whether a minimum of an inter-frame spacing (IFS) has been reached if the pause frame has not been received; and
   decreasing the inter-frame spacing for a number of frames by a value if the minimum of the inter-frame spacing has not been reached to increase the transmission rate.

5. The method according to claim 4, wherein the value is in byte time units, a byte time unit being the time it takes to send a byte of data onto a network media.

6. An input/output controller, comprising:
   a receiver circuit to determine whether a pause frame has been received; and
   a logic circuit adapted to wait a pause time specified by the pause frame, to determine whether a maximum of an inter-frame spacing (IFS) has been reached if the pause frame has been received, and to increase the inter-frame spacing by a value if the maximum of the inter-frame spacing has not been reached to reduce a transmission rate.

7. The input/output controller according to claim 6, wherein the value is based on a selection from the group consisting of a pause time in a pause frame, a frequency of pause frames and a proximity of a current inter-frame spacing to the maximum or a minimum of the inter-frame spacing.

8. The input/output controller according to claim 6, wherein the value is in byte time units, a byte time unit being the time it takes to send a byte of data onto a network media.

9. An input/output controller, comprising:
   a receiver circuit to determine whether a pause frame has been received after a packet count value is reached; and
   a logic circuit adapted to determine whether a minimum of an inter-frame spacing (IFS) has been reached if the pause frame has not been received, and to decrease the inter-frame spacing for a number of frames by a value if the minimum of the inter-frame spacing has not been reached to train a transmission rate.

10. The input/output controller according to claim 9, wherein the logic circuit is further adapted to wait a packet count value prior to determining whether the pause frame has been received by the receiver circuit.

11. The input/output controller according to claim 9, wherein the value is in byte time units, a byte time unit being the time it takes to send a byte of data onto a network media.

12. A program code storage device, comprising:
   a machine-readable storage medium; and
   machine-readable program code, stored on the machine-readable storage medium, having instructions, which when executed cause a computer to
   determine whether a pause frame has been received after a packet count is reached;
   determine, after waiting a pause time specified by the pause frame, whether a maximum of an inter-frame spacing (IFS) has been reached if the pause frame has been received, and
   increase the inter-frame spacing by a value if the maximum of the inter-frame spacing has not been reached to reduce a transmission rate.

13. The program code storage device according to claim 12, wherein the value is based on a selection from the group consisting of a frequency of pause frames and a proximity of a current inter-frame spacing to the maximum or a minimum of the inter-frame spacing.

14. The program code storage device according to claim 12, wherein the value is in byte time units, a byte time unit being the time it takes to send a byte of data onto a network media.

15. A program code storage device, comprising:
a machine-readable storage medium; and
machine-readable program code, stored on the machine-readable storage medium, having instructions, which when executed cause a computer to wait a poll time for an event to occur;
determine whether a pause frame has been received after a packet count value has been reached and after waiting the poll time,
determine whether a minimum of an inter-frame spacing (IFS) has been reached if the pause frame has not been received, and
decrease the inter-frame spacing for a number of frames by a value if the minimum of the inter-frame spacing has not been reached to increase a transmission rate.

16. The program code storage device according to claim 15, wherein the value is in byte time units, a byte time unit being the time it takes to send a byte of data onto a network media.

17. A network system, comprising:
a controller system to determine whether a pause frame has been received after a packet count value is reached, to determine, after waiting a pause time specified in the pause frame whether a maximum of an inter-frame spacing (IFS) has been reached if the pause frame has been received, and to increase the inter-frame spacing by a value if the maximum of the inter-frame spacing has not been reached to reduce a transmission rate; and
a trainer system to determine whether the pause frame has been received after a packet count value is reached, to determine whether a minimum of the inter-frame spacing has been reached if the pause frame has not been received, and to decrease the inter-frame spacing by a second value if the minimum of the inter-frame spacing has not been reached to increase the transmission rate.

18. The network system according to claim 17, wherein the value is in byte time units, a byte time unit being the time it takes to send a byte of data onto a network media.

19. The network system according to claim 17, wherein the second value is in byte time units, a byte time unit being the time it takes to send a byte of data onto a network media.

20. The network system according to claim 17, wherein the value is based on a selection from the group consisting of a frequency of pause frames and a proximity of a current inter-frame spacing to the maximum or the minimum of the inter-frame spacing.

* * * * *

UNITED STATES PATENT AND TRADEMARK OFFICE
CERTIFICATE OF CORRECTION

| | |
|---|---|
| PATENT NO. | : 7,061,866 B2 |
| APPLICATION NO. | : 10/044748 |
| DATED | : June 13, 2006 |
| INVENTOR(S) | : Patrick L. Connor |

Page 1 of 1

It is certified that error appears in the above-identified patent and that said Letters Patent is hereby corrected as shown below:

Column 6, between lines 7 and 8, claim 4, insert --waiting a poll time for an event to occur;-- after "comprising" and before "determining"

Column 6, line 41, claim 9, insert --to wait a poll time for an event to occur before the receiver circuit determines whether the pause frame has been received,-- between "adapted" and "to"

Column 6, line 60, claim 12, insert --value-- between "count" and "is"

Signed and Sealed this

Nineteenth Day of September, 2006

JON W. DUDAS
*Director of the United States Patent and Trademark Office*